United States Patent [19]
Wermelinger et al.

[11] Patent Number: 5,241,157
[45] Date of Patent: Aug. 31, 1993

[54] ARRANGEMENT FOR BUTT-WELDING PLASTIC MATERIAL COMPONENTS

[75] Inventors: Jörg Wermelinger, Schaffhausen, Switzerland; Peter Haug, Rielasingen, Fed. Rep. of Germany

[73] Assignee: Georg Fischer AG, Schaffhausen, Switzerland

[21] Appl. No.: 928,618

[22] Filed: Aug. 10, 1992

Related U.S. Application Data

[63] Continuation of Ser. No. 692,532, Apr. 29, 1992, abandoned.

[30] Foreign Application Priority Data

Apr. 27, 1990 [DE] Fed. Rep. of Germany ....... 4013471

[51] Int. Cl.$^5$ .............................................. B29C 65/20
[52] U.S. Cl. ................... 219/243; 156/380.9; 156/499; 156/304.2; 392/407; 219/553; 264/248
[58] Field of Search ............ 219/243, 228, 221, 553; 156/304.2, 304.6, 380.9, 499, 158, 503; 338/308-309; 392/440, 407, 432, 435; 165/133; 285/41; 264/248

[56] References Cited

U.S. PATENT DOCUMENTS

| | | | |
|---|---|---|---|
| 2,859,321 | 11/1958 | Garaway | 219/553 |
| 2,972,371 | 2/1961 | Hermann et al. | 156/499 |
| 3,013,925 | 12/1961 | Larsen . | |
| 3,391,045 | 7/1968 | Mojonnier et al. | 156/499 |
| 3,694,627 | 9/1972 | Blatchford et al. | 219/543 |
| 3,805,024 | 4/1974 | Joeckel et al. | 219/544 |
| 4,737,214 | 4/1988 | Leurink et al. | 156/304.2 |
| 4,927,642 | 5/1990 | Kunz | 156/503 |
| 4,929,293 | 5/1990 | Osgar | 156/304.5 |
| 4,933,036 | 6/1990 | Shaposka et al. | 156/158 |
| 5,183,524 | 2/1993 | Dommer et al. | 156/499 |
| 5,185,049 | 2/1993 | Bacon | 156/499 |

FOREIGN PATENT DOCUMENTS

| | | | |
|---|---|---|---|
| 657884 | 3/1938 | Fed. Rep. of Germany | 392/440 |
| 3712128 | 10/1988 | Fed. Rep. of Germany . | |
| 3717608 | 12/1988 | Fed. Rep. of Germany . | |
| 3741100 | 6/1989 | Fed. Rep. of Germany . | |
| 2599475 | 12/1987 | France | 392/435 |
| 57-37848 | 3/1982 | Japan | 392/435 |
| 58-29617 | 2/1983 | Japan | 156/304.2 |
| 1543341 | 4/1979 | United Kingdom | 392/432 |

OTHER PUBLICATIONS

Maschinen, Geräte. Verarbeitung, Kunstoffe 76 (1986) 4, pp. 318-323.

*Primary Examiner*—Bruce A. Reynolds
*Assistant Examiner*—John A. Jeffery
*Attorney, Agent, or Firm*—Anderson Kill Olick & Oshinsky

[57] ABSTRACT

An arrangement for butt-welding tubular plastic components includes two chucking devices for holding the components in coaxial positions relative to each other and a heating device for heating the ends of the components without contact. The heating device includes a heating element which can be swung between the two chucking devices. The heating element heats the ends of the components without contact by heat rays. The heating element includes a metal plate which is coated with a ceramic coating and which is electrically heatable by heating cartridges.

3 Claims, 3 Drawing Sheets

ARRANGEMENT FOR BUTT-WELDING PLASTIC MATERIAL COMPONENTS

This is a continuation of application Ser. No. 07/692,532, filed Apr. 29, 1992 now abandoned.

BACKGROUND OF THE INVENTION

FIELD OF THE INVENTION

The present invention relates to an arrangement for butt-welding plastic material components, particularly tubular components and pipes. The arrangement includes chucking devices for holding the components in coaxial positions relative to each other and a heating device which generates heat rays for heating without contact the ends of the components.

DESCRIPTION OF THE RELATED ART

An arrangement of the above-described type is known from U.S. Pat. No. 4,927,642. This known arrangement includes an annular heating device arranged around the tubular components to be connected. In this arrangement, a uniform heating of the end faces of the tubular components to a predetermined temperature is not possible because the heat-radiating surfaces of the heating device are located too far away from the end faces and at different distances from the end faces.

DE-GBM-7425376 also discloses an arrangement for welding molded components in the form of hollow sections, wherein the heating device is of linear construction because its heat radiation producing means is a filament. Therefore, a specially adjusted heating device must be used for each different hollow section.

SUMMARY OF THE INVENTION

Therefore, it is the object of the present invention to provide an arrangement of the above-described type whose heating device is suitable for the problem-free welding of thermoplastic materials which are difficult to weld, such as, Perfluralkoxy-Cop., Ethylene-chlortrifluoroethylene-Cop., polyvinylidene fluoride and polyvinyl chloride. In addition, the heating device should be capable of uniformly heating the surfaces to be welded of different dimensions.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 4 is a sectional view of a heating element; and

FIG. 5 is a partial sectional view, on a larger scale, showing a detail of the heating element of FIG. 4.

DESCRIPTION OF THE PREFERRED EMBODIMENT

Figure 1:
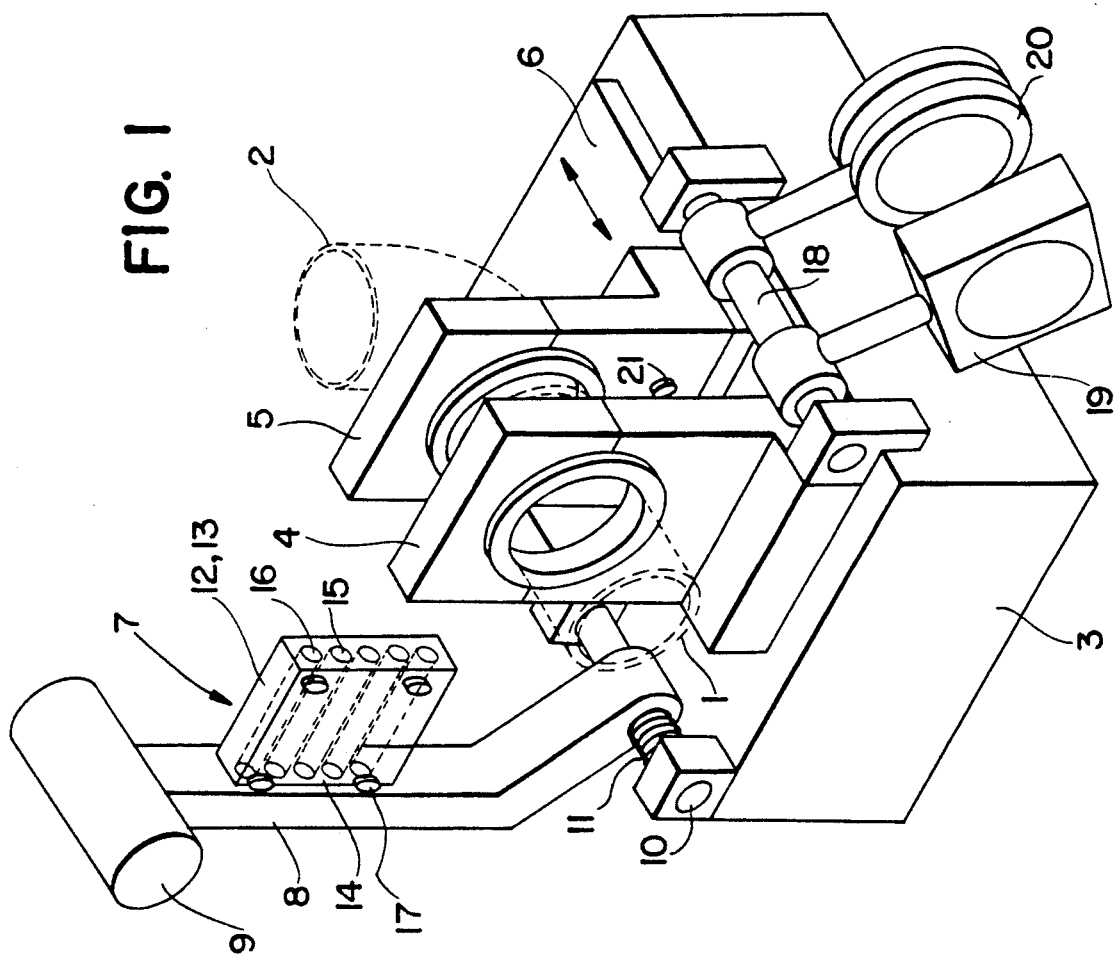
FIG. 1 is a schematic perspective view of an arrangement for butt-welding plastic material components according to the present invention.

FIG. 1 of the drawing shows an arrangement for butt-welding tubular components, such as, a plastic pipe 1 and a molded component 2.

The arrangement includes a base frame 3 on which are arranged a fixedly mounted chucking device 4 and a chucking device 5 which is axially displaceable on a carriage 6.

The heating device 7 is mounted on a support member which is constructed as a pivotable lever 8. The heating device 7 can be swung by means of a handle 9 between the ends of the chucked tubular components 1, 2.

The lever 8 is mounted so as to be pivotable on a shaft 10 and so as to be axially displaceable against the pressure of a spring 11 in the direction of the stationary chucking device 4. The heating device 7 is an infrared heating device, wherein the end faces of the tubular components 1, 2 are heated without contact by means of heat rays or infrared rays.

The heating device 7 includes a heating element 12 shown in FIG. 4. The heating element 12 is a metal plate 13 provided with a ceramic coating 14. The metal plate 13 is made, for example, of copper or a steel. The metal plate 13 has bores in which several electrically heatable heating cartridges 15 are arranged. The heating cartridges 15 ensure a relatively uniform heating of the metal plate 13. At least one or preferably two thermosensors 16 are arranged in the metal plate 13 and are connected to a control unit for the heating device 7. As shown in FIG. 4, one of the heating cartridges 15 is equipped with a thermosensor 16. It is also possible to arrange one or more thermosensors in the metal plate 13 separately from the cartridges 15. The metal plate 13 is preferably made of copper, so that the heating device 7 can be quickly heated due to the excellent heat conductivity of the copper. The ceramic coating 14 increases the heat radiation intensity or degree of heat emission, so that a better efficiency of the heating device is achieved.

In accordance with an advantageous feature, as indicated by reference numeral 28 in FIG. 5, the copper plate is chemically nickel-plated before the ceramic coating is applied in order to obtain a gas-tight protection. The nickel-plating prevents oxidizing of the copper even under the ceramic layer. The ceramic layer 14 preferably has a thickness of between 0.1 and 0.6 mm and ensures a uniform radiation of the heat energy over the entire surface. In addition, due to the selected construction and materials, a very narrow temperature band (temperature difference) is maintained at the surface of the heating device.

Stop cams 17 are arranged on the heating element 12. By axially displacing the heating device 7, the stop cams 17 are moved into contact with the chucking devices 4, 5. A round bar 18 is fastened at the front side of the base frame 3. A stop member 19 and a cutting tool 20 are arranged on the round bar 18 so as to be pivotable and axially displaceable.

The stop member 19 and the cutting tool 20 can be swung between the chucking devices 4, 5. The cutting tool 20 can be driven by means of a ratchet or also by means of a motor. In addition, the cutting tool 20 has cutting edges on both sides for working on the end faces of the tubular components 1, 2.

Figure 2:
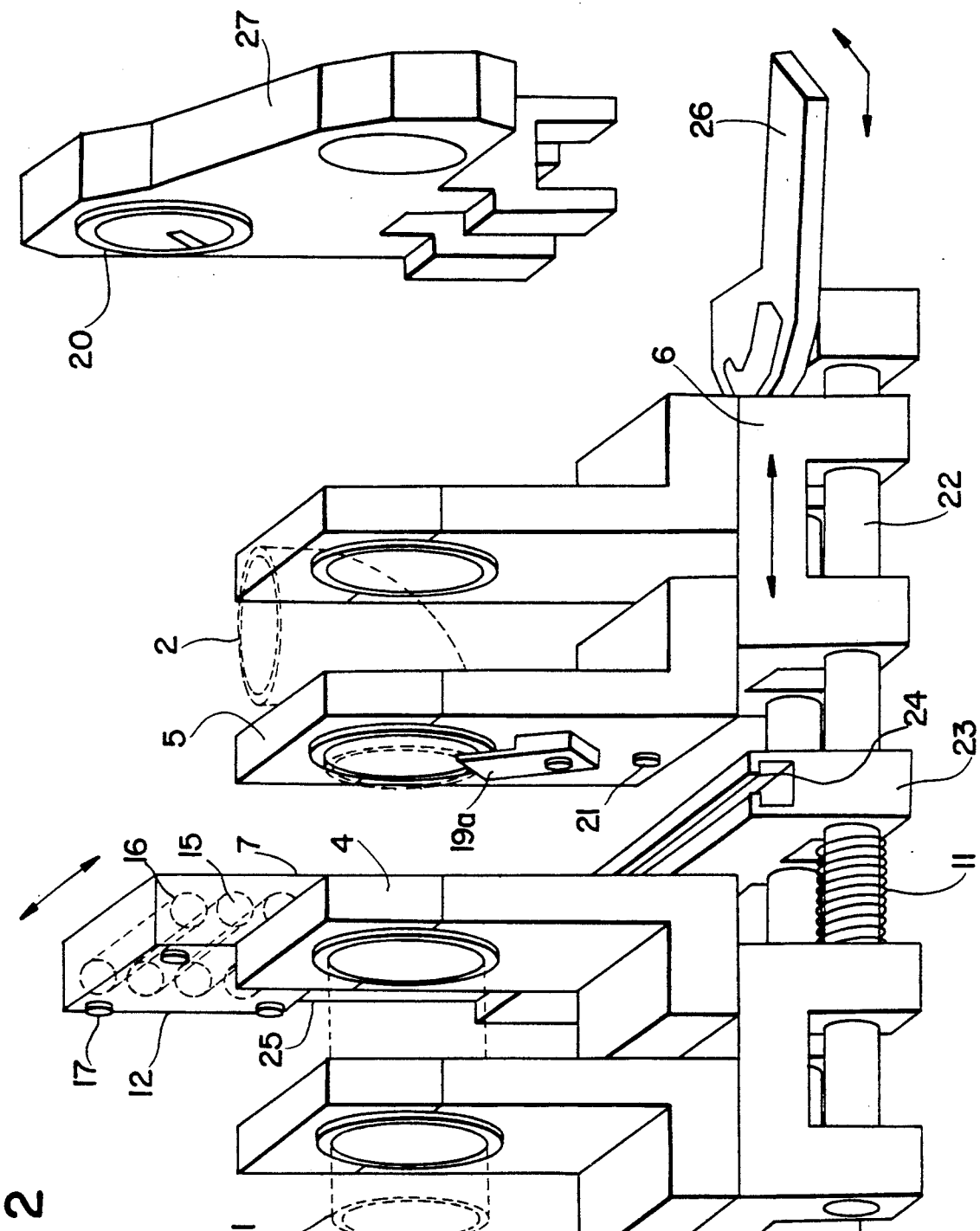
FIG. 2 is a schematic perspective view of another embodiment of the arrangement according to the present invention.

In the embodiment shown in FIG. 2, the carriage 6 for the chucking device 5 is arranged on a guide 22 which preferably is formed by two round guide rods.

A carriage 23 with a transverse guide member 24 is arranged between the two chucking devices 4 and 5 connected to and displaceable on the guide 22. A support member 25 for the heating device 7 can be moved on the transverse guide member 24 between the two chucking devices either by hand or mechanically by means of a displacement guide, not illustrated.

As already described in respect to FIG. 1, the heating device 7 has a heating element 12 with heating cartridges 15, thermosensors 16 and stop cams 17.

The carriage 23 with the heating device 7 can be moved in the direction of the tubular component axis by sliding the carriage 6 against the pressure of the spring 11, as already described in connection with FIG. 1.

Pivotable or displaceable stop members 19a are arranged on the end faces of the two chucking devices and serve to align the tubular components 1 and 2 to be chucked in the chucking device.

The cutting tool 20 is arranged on a support member 27 which can be placed on the carriage 23. The cutting tool 20 can be moved radially between the chucking devices 4, 5.

A lever 26 is provided for displacing the chucking device 5 with the carriage 6.

The sequence of the welding procedure is described below with regard to FIGS. 3A, 3B, 3C and 3D.

Figure 3A:
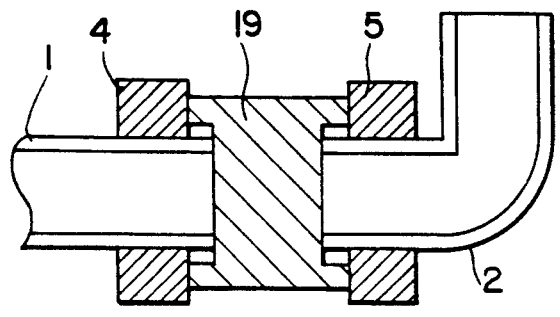
FIGS. 3A–3D are schematic sectional views showing different operating positions of parts of the arrangements of FIGS. 1 and 2 with tubular components.

Initially, as shown in FIG. 3A, the stop member 19 or the two stop members 19a (FIG. 2) must be swung between the two chucking devices 4, 5. Subsequently, the tubular components 1, 2 can be chucked. Prior to chucking, the tubular components 1, 2 are displaced axially to the stop. In the embodiment in FIG. 1, the displaceable chucking device 5 on the carriage 6 must be pressed against the stop member 19.

After the tubular components 1, 2 have been chucked, the displaceable chucking device is moved back and the stop member 19 is swung out. In the embodiment of FIG. 2 it is only necessary to swing out the stop members 19a.

Figure 3B:
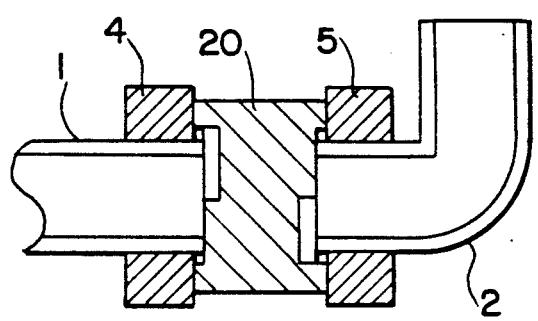

For working on the end faces of the tubular components 1, 2, the cutting tool 20 is swung in or moved in radially, as shown in FIG. 3b. The cutting tool 20 is pressed against the end faces of the components 1, 2 by means of the displaceable chucking device 5. Simultaneously, by rotating the cutting tool 20 by means of a ratchet, the ends of the components are cut in a chip-producing procedure to a fixed dimension.

The work on the ends of the components 1, 2 is finished when the cutting tool 20 rests against the two chucking devices 4, 5.

After moving back the displaceable chucking device 5, the cutting tool 20 is swung out or pushed back and the end faces of the components 1, 2 can then be checked whether they are clean and whether the dimensions are accurate.

Figure 3C:
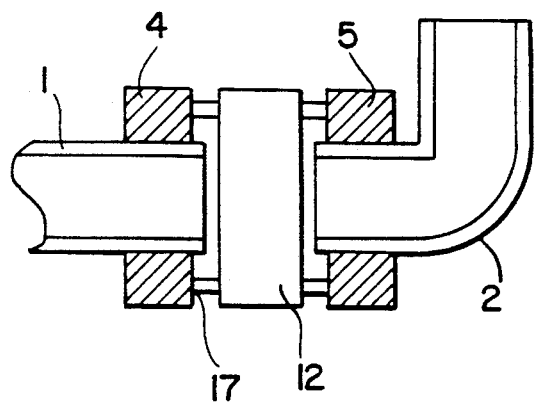

The heating element 12 which has been heated in the meantime is now moved by means of the handle 9 or by means of a drive between the components 1, 2 to be welded together. By axially displacing the carriage 6, the chucking device 5 comes into contact with the stop cam 17 of the heating element 12, wherein the heating device 7 is moved further against the pressure of the spring 11 until the stop cams 17 on the other side of the heating element 12 rests against the chucking device 4, as shown in FIG. 3C.

Figure 3D:
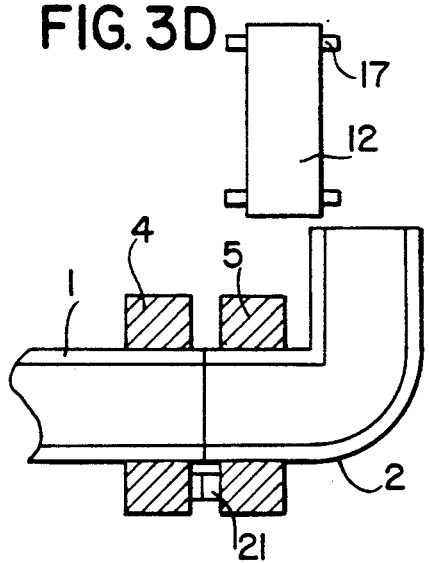

In the above-described position, the two surfaces of the heating element 12 have a distance from the end faces of the components 1, 2 to be welded which ensures quick heating while no contact takes place between the heating element 12 and the components 1, 2. After the end of a preadjusted heating time, the carriage 6 is quickly moved back to a small extent and the heating device 7 is moved from the welding area into its position of rest. The components to be welded together are then pressed together by displacing the chucking device 5. As shown in FIG. 3D, stop members 21 at the chucking devices 4, 5 limit the movement of the chucking device 5. By adjusting the size of the stop member 21 and by adjusting the welding temperature, depending on the material to be welded, an optimum welded connection can be obtained which, in addition, has very small welding beads.

The entire arrangement can be automated when drives, not shown, are provided for all movements and if a program control is provided.

While specific embodiments of the invention have been shown and described in detail to illustrate the inventive principles, it will be understood that the invention may be embodied otherwise without departing from such principles.

We claim:

1. An arrangement for butt-welding plastic material components, especially tubular components and pipes, comprising:
   chucking device for holding said components in co-axial positions;
   a heating device for heating the ends of said components without contact by means of heat rays wherein said heating device comprises:
   a heating element of an electrically heatable copper plate which is coated by a ceramic coating having a thickness of 0.1–0.6 mm and further wherein;
   a plurality of heating cartridges and at least one thermosensor are mounted in said copper plate;
   a support member movable between said chucking devices wherein said heating element is mounted on said support member and further wherein said support member is displaceable in an axial direction of a tubular component axis, and further wherein said heating element includes stop cams wherein said stops cams are displaceable into contact with end faces of said chucking devices.

2. The arrangement of claim 1 wherein said support member is displaceable in an axial direction of a tubular component axis against the pressure of a spring.

3. The arrangement of claim 1 further comprising:
   a thin nickel layer between said copper plate and said ceramic coating.

* * * * *